US007769393B2

(12) United States Patent
Jendbro et al.

(10) Patent No.: US 7,769,393 B2
(45) Date of Patent: Aug. 3, 2010

(54) COOPERATIVE GLOBAL POSITIONING SYSTEM (GPS) PROCESSING BY MOBILE TERMINALS THAT COMMUNICATE VIA AN AD HOC WIRELESS NETWORK

(75) Inventors: Magnus Jendbro, Staffanstorp (SE); William O. Camp, Jr., Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1132 days.

(21) Appl. No.: 11/389,739

(22) Filed: Mar. 27, 2006

(65) Prior Publication Data

US 2007/0225016 A1 Sep. 27, 2007

(51) Int. Cl.
*H04Q 7/20* (2006.01)
(52) U.S. Cl. ............... 455/456.1; 455/41.1; 342/357.12
(58) Field of Classification Search ................ 455/41.2, 455/11.1, 404.2, 456.1; 342/357.12, 357.06, 342/357.08, 357.01
See application file for complete search history.

(56) References Cited

U.S. PATENT DOCUMENTS

| 6,043,777 | A | * | 3/2000 | Bergman et al. ....... 342/357.09 |
| 6,097,974 | A | | 8/2000 | Camp, Jr. et al. |
| 6,424,826 | B1 | | 7/2002 | Horton et al. |
| 6,885,337 | B2 | | 4/2005 | Jendbro et al. |
| 2005/0052318 | A1 | | 3/2005 | Jendbro et al. |

FOREIGN PATENT DOCUMENTS

| GB | 2 410 653 A | | 8/2005 |
| GB | 2410653 A | * | 8/2005 |

OTHER PUBLICATIONS

Notification of Transmittal of the International Search Report and the Written Opinion of the International Searching Authority, or the Declaration; International Search Report; and Written Opinion of the International Searching Authority, PCT/US2006/019077, Nov. 13, 2006.
U.S. Appl. No. 60/681,926, filed May 17, 2005, Tryding et al.

* cited by examiner

*Primary Examiner*—Nay A Maung
*Assistant Examiner*—Angelica M Perez
(74) *Attorney, Agent, or Firm*—Myers Bigel Sibley & Sajovec, P.A.

(57) ABSTRACT

The position of a given mobile terminal is determined by communicating satellite positioning system information between the given mobile terminal and at least one other mobile terminal over a short-range, ad hoc wireless network, such as a Bluetooth network, to cooperatively determine the position of the given mobile terminal by the given mobile terminal and the at least one other mobile terminal that communicate over the short-range, ad hoc wireless network. Satellite positioning system information may communicated by distributing processing of the satellite positioning information, by distributing receiving of satellite positioning system information from a satellite, by communicating assistance data and/or by synchronizing timing of satellite positioning information, between the given mobile terminal and the at least one other mobile terminal over the short-range, ad hoc wireless network.

23 Claims, 12 Drawing Sheets

COOPERATIVE GLOBAL POSITIONING SYSTEM (GPS) PROCESSING BY MOBILE TERMINALS THAT COMMUNICATE VIA AN AD HOC WIRELESS NETWORK

TECHNICAL FIELD OF THE INVENTION

This invention relates to wireless communications networks, methods and devices, and more particularly to determining the position of a mobile terminal.

DESCRIPTION OF RELATED ART

Wireless communication systems (networks) are commonly employed to provide voice and data communications to subscribers. For example, analog cellular systems, such as those designated AMPS, ETACS, NMT-450, and NMT-900, have long been deployed successfully throughout the world. Digital cellular systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data).

In addition to such regulated wide area cellular networks, ad hoc, short-range transmission protocols and wireless local area networks (WLAN) are also known. For example, ad hoc, short-range wireless coupling between mobile terminals can be provided using the Bluetooth protocol for short-range transmission (typically up to a maximum distance of 100 meters). As is well known to those having skill in the art, Bluetooth is a global standard that can eliminate wires and cables between both stationary and mobile devices, can facilitate both data and voice communication, and can provide ad hoc networks that can be set up automatically and provide synchronicity between network devices. Bluetooth is described in detail at Bluetooth.com.

It is desirable, and in certain places mandated by law, that mobile telecommunication network providers be able to determine an approximate geographical location of a mobile terminal, such as, for example, an actively communicating cellular telephone.

A variety of mobile location techniques have been proposed. These location techniques include Global Positioning System (GPS)-based approaches and assisted GPS approaches combining communication signals and GPS signals. As is well known to those having skill in the art, GPS is a satellite navigation system that is funded by and controlled by the U.S. Department of Defense, that provides specially coded satellite signals that can be processed in a GPS receiver, enabling the receiver to compute position, velocity and/or time. As used herein, the term "GPS" also includes other satellite-based systems that can be used to measure positions on the earth, such as GLONASS and Galileo.

FIG. 1 illustrates a conventional terrestrial wide area mobile (wireless) communications network 20 that may implement any one of a variety of known wireless communications standards including uplink and downlink signals. The wireless network 20 may include one or more mobile terminals 22 that communicate with a plurality of cells 24 served by base stations 26 and a mobile telephone switching office (MTSO) 28. Although only three cells 24 are shown in FIG. 1, a typical cellular network may comprise hundreds of cells, and may include more than one MTSO 28 and may serve thousands of wireless mobile terminals 22.

The cells 24 generally serve as nodes in the network 20, from which links are established between mobile terminals 22 and a MTSO 28, by way of the base stations 26 servicing the cells 24. Each cell 24 will have allocated to it one or more dedicated control channels and one or more traffic channels. The control channel is a dedicated channel that may be used for downlink transmission (network to mobile) of cell identification and paging information. The traffic channels carry the voice and data information. Through the network 20, a duplex (downlink and uplink) radio communication link 30 may be effected between two mobile terminals 22 or between a mobile terminal 22 and a landline telephone user 32 via a public switched telephone network (PSTN) 34. The function of the base station 26 is commonly to handle the radio communications between the cell 24 and the wireless mobile terminal 22. In this capacity, the base station 26 may function chiefly as a relay station for data and voice signals. It is also known to provide wide area cellular wireless communications networks in which the functions provided by the base stations are provided by satellites, having associated coverage areas, rather than terrestrial base stations.

The GPS location approach generally uses location services not associated with either the uplink or downlink signals used in the mobile telecommunications network. In a typical GPS application, the GPS receivers collect and analyze ranging measurements from signals transmitted by GPS satellites having known locations.

As illustrated in FIG. 2, GPS is a space-based triangulation system using satellites 42 and GPS control computers 48 to measure positions on the earth. GPS was first developed by the United States Department of Defense as a navigational system. This navigational system may not be limited in its coverage, may provide continuous 24-hour coverage, and may be highly accurate regardless of weather conditions. In operation, a constellation of 24 satellites 42 orbiting the earth continually emit a GPS radio signal 44. A GPS receiver 46, e.g., a hand-held radio receiver with a GPS processor, receives the radio signals from the visible satellites and measures the time that the radio signal takes to travel from the GPS satellites to the GPS receiver antenna. By multiplying the travel time by the speed of light, the GPS receiver can calculate a range for each satellite in view. Ephemeris information provided in the satellite radio signal typically describes the satellite's orbit and velocity, thereby generally enabling the GPS processor to calculate the position of the GPS receiver 46 through a process of triangulation. It is known to include a GPS receiver 46 in a mobile terminal 22 to provide position location functionality to the mobile terminal 22.

The startup of a GPS receiver typically requires the acquisition of a set of navigational parameters from the navigational data signals of four or more GPS satellites. This process of initializing a GPS receiver may often take several minutes. The duration of the GPS positioning process generally is directly dependent upon how much information a GPS receiver has initially. Some GPS receivers are programmed with almanac data, which coarsely describes the expected satellite positions for up to one year ahead. However, if the GPS receiver does not have some knowledge of its own approximate location, then the GPS receiver may not be able to find or acquire signals from the visible satellites quickly enough, and, therefore, cannot calculate its position quickly. Furthermore, it should be noted that a higher signal strength is typically needed for capturing the navigation data at start-up than is needed for continued monitoring of an already-acquired signal. It should also be noted that the process of monitoring the GPS signal may be significantly affected by environmental factors. Thus, a GPS signal which may be easily acquired in the open typically becomes harder to acquire when a receiver is under foliage, in a vehicle or in a building.

It is also known to provide mobile terminals with accurate location assistance data, e.g., local time and position estimates, satellite ephemeris and clock information, and a visible satellite list (which generally varies with the location of the mobile station). The use of such assistance data can permit a GPS receiver that is integrated with or connected to a mobile terminal to expedite the completion of its start-up procedures.

GPS receivers may be integrated into a mobile terminal. See, for example, U.S. Pat. No. 6,424,826 to Horton et al., entitled Systems and Methods for Sharing Reference Frequency Signals Within a Wireless Mobile Terminal Between a Wireless Transceiver and a Global Positioning System Receiver; and U.S. Pat. No. 6,097,974 to Camp, Jr. et al., entitled Combined GPS and Wide Bandwidth Radiotelephone Terminals and Methods.

It is also known to provide mobile terminals with an ability to participate in a short-range ad hoc wireless network, by providing short-range, ad-hoc wireless network capability, such as Bluetooth capability, therein. FIG. 3 illustrates a plurality of mobile terminals 50 that may be part of a conventional terrestrial wide area wireless communications network. A subset of the mobile terminals 50' that are close to one another, may be interconnected by a short-range, ad hoc wireless network 60 using short-range, ad hoc wireless links 62 between the mobile terminals 50'. The ad hoc network 60 can be set up automatically, and provide synchronicity between the mobile terminals 50'.

As used herein, the term "mobile terminal" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a cellular radio frequency transceiver and a pager, Internet/intranet access, Web browser, organizer, calendar and/or conventional laptop and/or palmtop computers or other appliances, which include a cellular radio frequency transceiver. As used herein, a mobile terminal also includes short-range, ad hoc network connectivity. A GPS receiver may or may not be included in the mobile terminal.

SUMMARY

Embodiments of the present invention include networks, methods, systems (apparatus) and devices for determining a position of a mobile terminal. The position of a given mobile terminal is determined by communicating satellite positioning system information between the given mobile terminal and at least one other mobile terminal over a short-range, ad hoc wireless network, such as a Bluetooth network, to cooperatively determine the position of the given mobile terminal by the given mobile terminal and the at least one other mobile terminal that communicate over the short-range, ad hoc wireless network. In some embodiments, satellite positioning system information is communicated by distributing processing of satellite positioning information, by distributing receiving of satellite positioning system information from a satellite, by communicating assistance data and/or by synchronizing timing of satellite positioning information, between the given mobile terminal and the at least one other mobile terminal over the short-range, ad hoc wireless network. These embodiments may be combined in various combinations and subcombinations.

In some embodiments, cooperative processing takes place by distributing the processing of the satellite positioning information among one or more mobile terminals that are connected by the short-range, ad hoc wireless network. Specifically, the satellite positioning information that is used to determine the position of the given mobile terminal is partitioned into a plurality of partitions. At least one of the partitions is communicated to at least one other mobile terminal over the short-range, ad hoc wireless network for processing by the at least one other mobile terminal. In some embodiments, the results of the processing may be received from the at least one other mobile terminal over the short-range, ad hoc wireless network. The results of the processing by the various mobile terminals may be combined to determine the position of the given mobile terminal.

In other embodiments, processing instructions for the partitions may also be communicated over the short-range, ad hoc wireless network, so that the mobile terminals know how to process their partition(s). In still other embodiments, ancillary data for at least one of the partitions may also be communicated over the short-range, ad hoc wireless network. In some embodiments, partitioning may be based on partitioning satellite positioning information for a respective one of a plurality of satellite positioning system satellites. In particular, information for a respective GPS satellite may be processed by a respective one of the mobile terminals that are linked together in the short-range, ad hoc wireless network. Moreover, in other embodiments, processing may be duplicated by two or more of the mobile terminals, and the mobile terminal that obtains the results first may send the results back over the short-range, ad hoc wireless network.

In other embodiments of the invention, the cooperative processing may take place by distributing the receiving of satellite positioning information from a satellite among the mobile terminals that are linked by the short-range, ad hoc wireless network. In particular, in some embodiments, a first portion of the satellite positioning system information, such as information from a first GPS satellite, may be received from the satellite positioning system at the given mobile terminal. At least a second portion of the satellite positioning system information, such as satellite positioning system information from at least a second GPS satellite, may be received from the satellite positioning system by the at least one other mobile terminal. At least one of the portions of the satellite positioning system information is then communicated over the short-range, ad hoc wireless network. In some embodiments, at least one portion of the satellite positioning system information that is received is processed by the receiving mobile terminal, to provide processed satellite positioning system information, which is then communicated over the short-range, ad hoc wireless network. Thus, even though a given mobile terminal may not be exposed to four or more GPS satellites, the position of the given mobile terminal may be determined using data from other mobile terminals that are exposed to other GPS satellites and are interconnected by a short-range, ad hoc wireless network.

Still other embodiments of the present invention cooperatively process satellite positioning information by communicating satellite position system timing information (e.g., satellite positioning system PN code phase information) among the mobile terminals that are linked by the short-range, ad hoc wireless network. Specifically, in some embodiments, satellite positioning system timing information is communicated between the given mobile terminal and at least one other mobile terminal over the short-range, ad hoc wireless network, to cooperatively determine the position of the given mobile terminal by the given mobile terminal and the at least one other mobile terminal that communicate over the short-range, ad hoc wireless network. In some embodiments, the satellite positioning system timing information that is communicated between a given mobile terminal and the at least one other mobile terminal over the short-range, ad hoc wireless network is synchronized relative to a feature of a protocol that is used for the short-range, ad hoc wireless network communications. For example, synchronization with respect to a header field of a short-range, ad hoc wireless network communications may be used for synchronization purposes, to preserve the timing information as it is communicated among the mobile terminals that are linked by the short-range, ad hoc wireless network.

In some embodiments, the satellite positioning system timing information is communicated in response to a request for satellite positioning system timing information, that is communicated between the given mobile terminal and the at least one other mobile terminal over the short-range, ad hoc wireless network. In other embodiments, the satellite positioning system timing information may be repeatedly broadcast between the given mobile terminal and the at least one other mobile terminal over the short-range, ad hoc wireless network. It will also be understood by those having skill in the art that synchronizing relative to a feature of the short-range, ad hoc wireless communication protocol may be used in distributing other satellite positioning system information among the mobile terminals, according to other embodiments of the present invention.

Still other embodiments of the present invention communicate assistance data among the mobile terminals that are connected by the short-range, ad hoc wireless network. Specifically, assistance data may be communicated between the given mobile terminal and the at least one other mobile terminal over the short-range, ad hoc wireless network, to cooperatively determine the position of the given mobile terminal by the given mobile terminal and the at least one other mobile terminal that communicate over the short-range, ad hoc wireless network, using the assistance data. As was the case with satellite positioning system timing information, the assistance data may be communicated in response to a specific request and/or may be repeatedly broadcast. Moreover, the assistance data may be synchronized relative to a feature of the short-range, ad hoc wireless network communications protocol.

It will be understood by those having skill in the art that embodiments of the invention have been described above primarily with respect to methods of determining a position of a given mobile terminal. However, other embodiments of the invention can provide mobile terminals that include a cellular network transceiver that is configured to communicate with a cellular base station, a short-range, ad hoc wireless network transceiver that is configured to communicate over a short-range, ad hoc wireless network, and a mobile terminal positioning system that is configured to communicate satellite positioning information between the mobile terminal and at least one other mobile terminal via the short-range, ad hoc wireless network transceiver, to cooperatively determine the position of a mobile terminal. Any of the embodiments described above may be used by the mobile terminal positioning system.

Moreover, other embodiments of the invention can include a short-range, ad hoc wireless network that comprises a plurality of mobile terminals that are configured to communicate satellite positioning system information among one another over short-range, ad hoc wireless network links to cooperatively determine a position of at least one of the mobile terminals. Any of the embodiments described above may be used to cooperatively determine the position of at least one of the mobile terminals. Finally, it will be understood by those having skill in the art that embodiments of the present invention described above may be combined in various combinations and subcombinations.

DETAILED DESCRIPTION OF EMBODIMENTS

Figure 1:
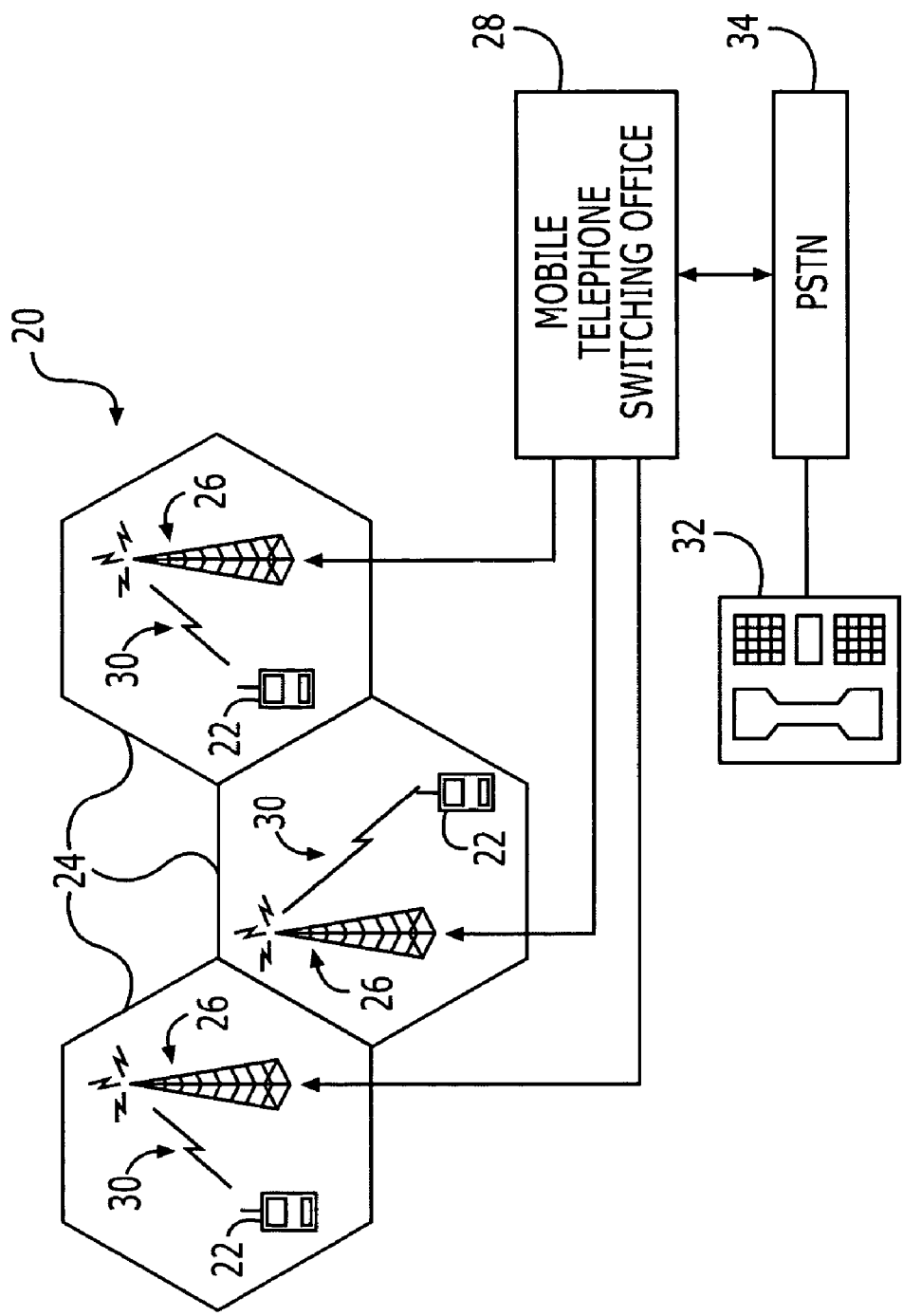
FIG. 1 is a schematic block diagram illustrating a conventional cellular communications system.
Figure 2:
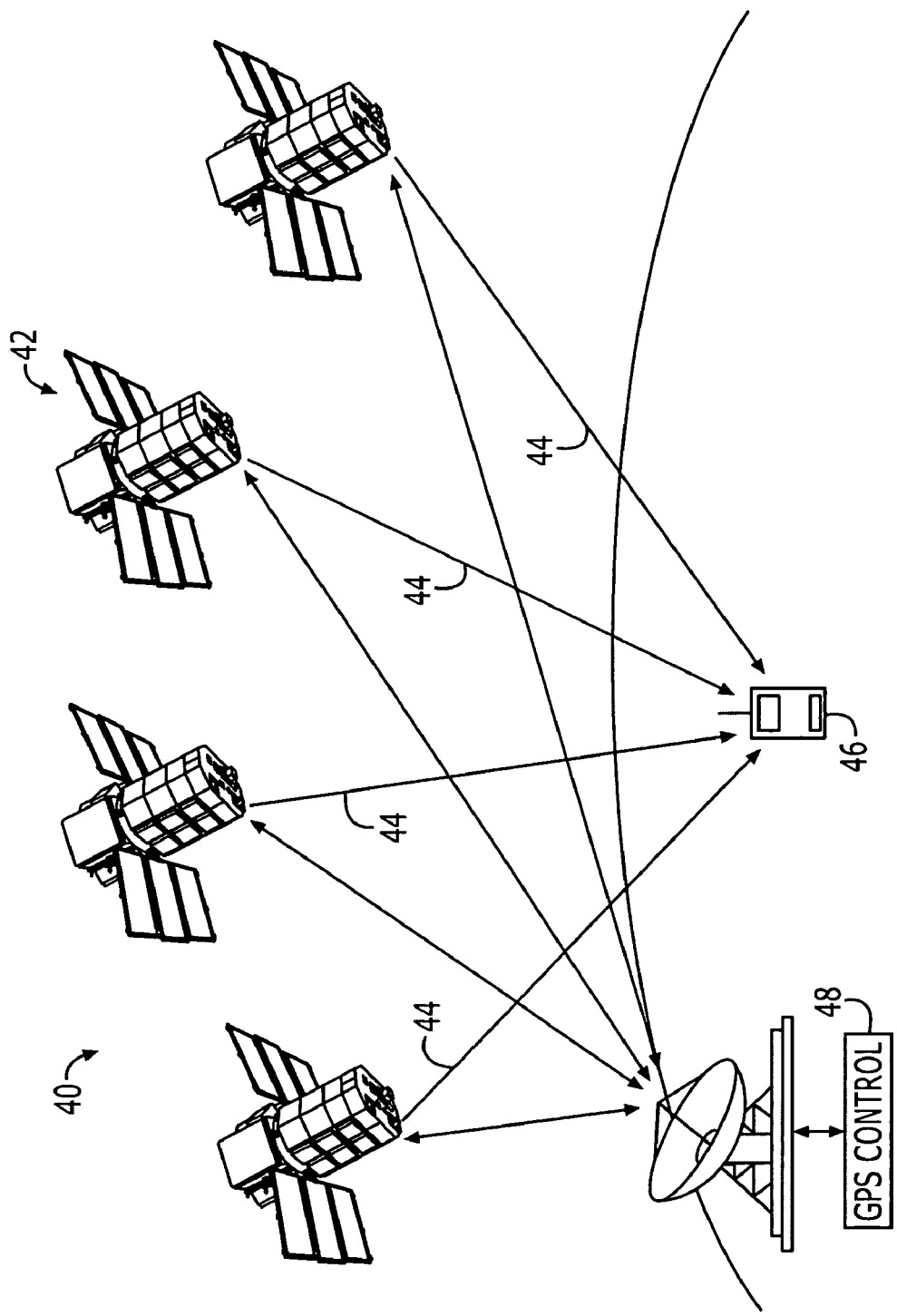
FIG. 2 is a schematic block diagram illustrating a GPS system.
Figure 3:
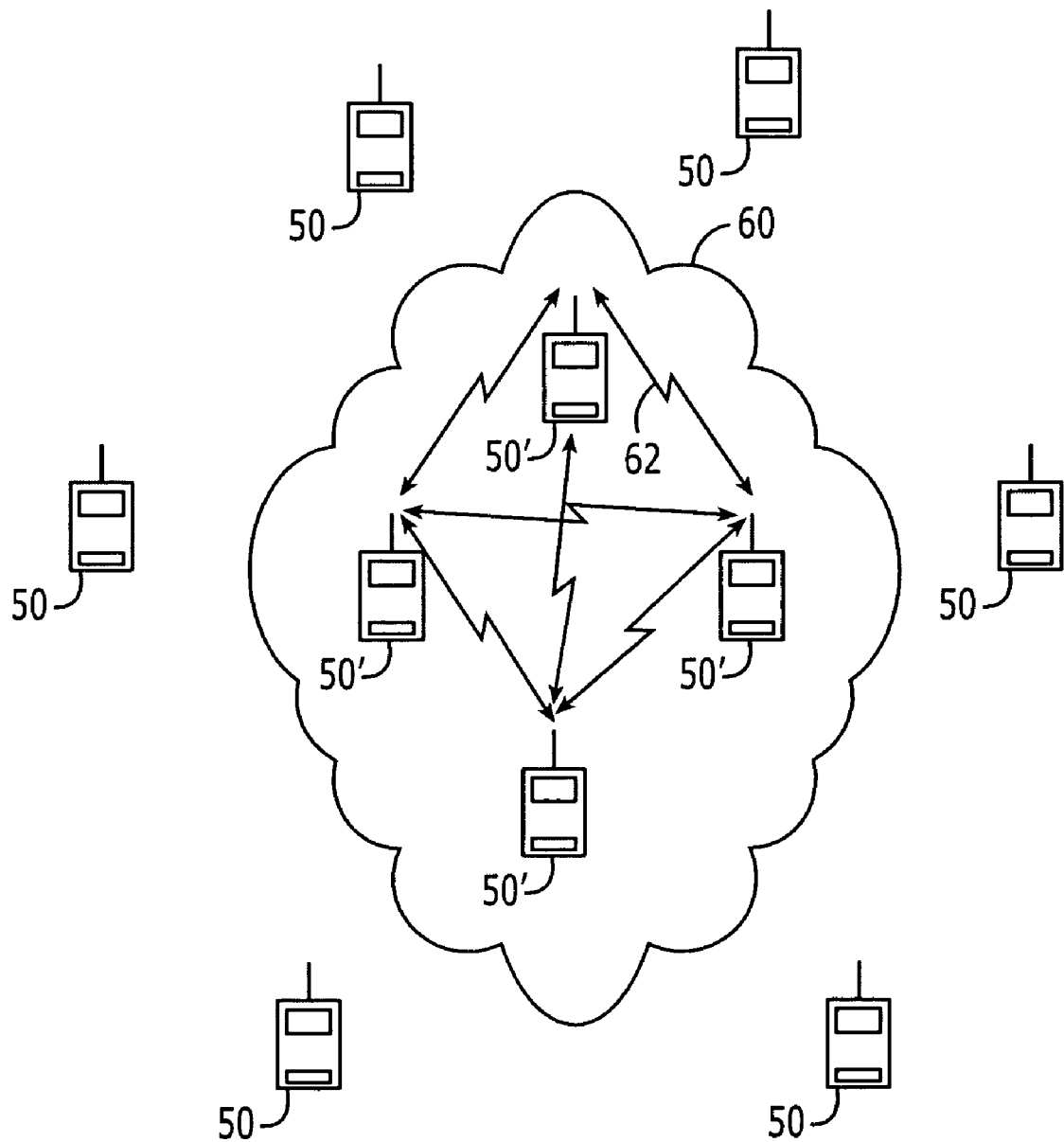
FIG. 3 is a schematic block diagram illustrating a short-range, ad hoc wireless network.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element, it can be directly responsive to the other element, or intervening elements may be present. In contrast, when an element is referred to as being "directly responsive" to another elements, there are no intervening elements present. As used herein the term "and/or" includes any and all combinations of one or more of the associated listed items and may be abbreviated as "/". It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

The present invention is described below with reference to block diagrams and/or flowchart illustrations of methods, apparatus (systems) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

In accordance with certain embodiments of the present invention, a position of a given mobile terminal is determined by communicating satellite positioning system information between the given mobile terminal and at least one other mobile terminal that communicate over a short-range, ad hoc wireless network, to cooperatively determine the position of the given mobile terminal by the given mobile terminal and the at least one other mobile terminal that communicate over the short-range, ad hoc wireless network. As will be described in detail below, satellite positioning system information may be used cooperatively by distributing processing of satellite positioning information, by distributing receiving of satellite positioning system information from a satellite, by communicating assistance data and/or by synchronizing timing of satellite positioning information between the given mobile terminal and at least one other mobile terminal, over the short-range, ad hoc wireless network.

Figure 4:
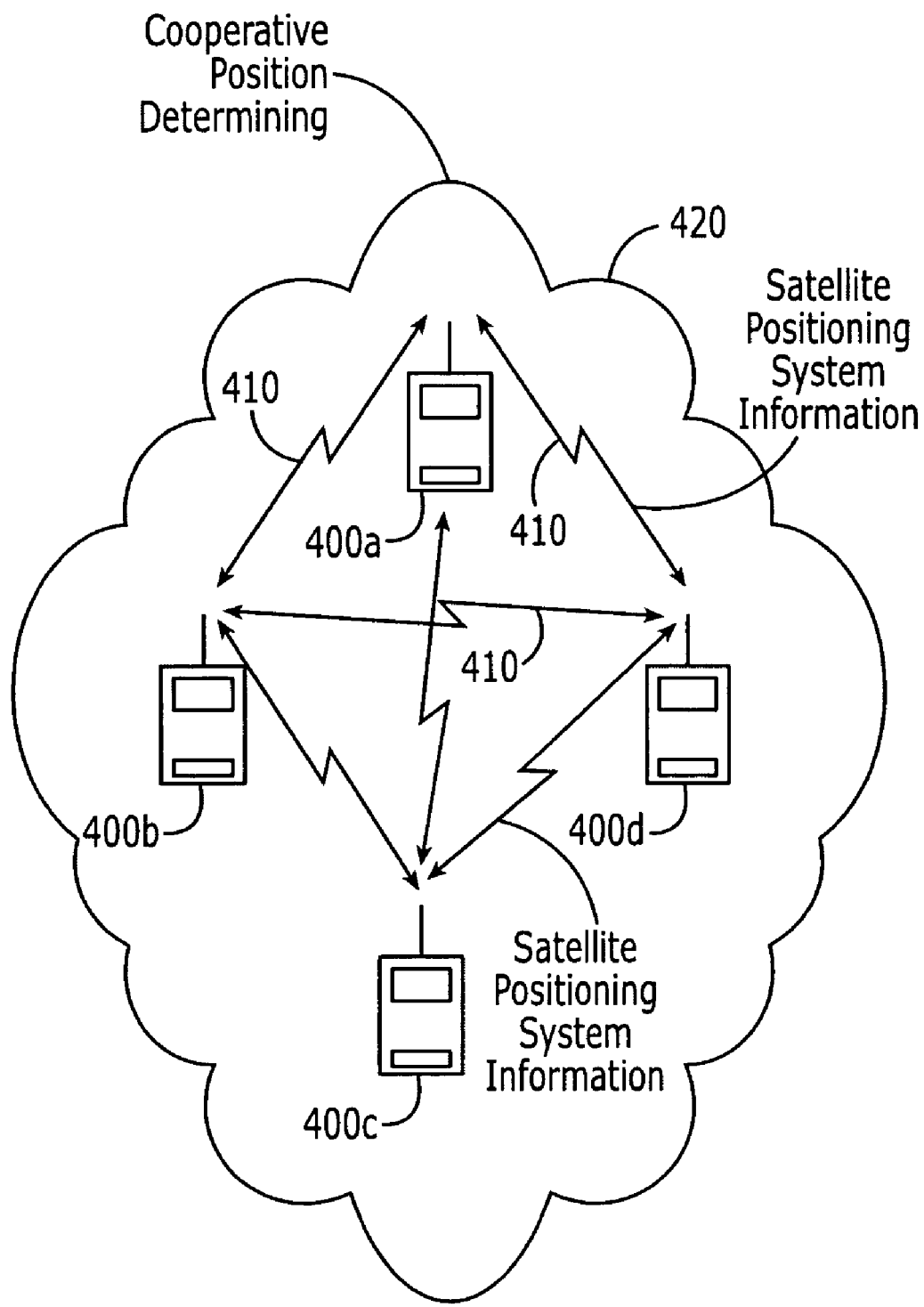
FIG. 4 is a schematic block diagram illustrating cooperative position determining according to various embodiments of the present invention.

FIG. 4 illustrates position determining systems, methods, networks and devices according to some embodiments of the present invention. As shown in FIG. 4, a short-range, ad hoc wireless network is set up among four mobile terminals 400a-400d. One of the mobile terminals 400a will be referred to as a "given" mobile terminal whose position is to be determined, whereas the other mobile terminals 400b-400d will be referred to as an "other" mobile terminal that helps to determine the position of the given mobile terminal 400a. However, it will be understood by those having skill in the art that fewer or more than four mobile terminals 400a-400d may be included in the short-range, ad hoc wireless network 420. The mobile terminals communicate among one another over a plurality of short-range, ad hoc wireless network links 410.

Moreover, the mobile terminals 400a-400d may be the same as one another and/or different from one another.

Still referring to FIG. 4, according to certain embodiments of the present invention, satellite positioning system information is communicated among the given mobile terminal 400a and at least one other mobile terminal 400b-400d over the short-range, ad hoc wireless network 420 using the links 410 to cooperatively determine the position of the given mobile terminal 400a by the given mobile terminal 400a and at least one other mobile terminal 400b-400d that communicate over the short-range, ad hoc wireless network 420.

Some embodiments of the present invention may arise from a recognition that mobile terminals having GPS receivers may execute GPS software using the existing computing power in the mobile terminal that is normally used for other purposes, such as for cellular communications, rather than including dedicated GPS hardware. These mobile terminals also may have short-range, ad hoc wireless network capabilities. Unfortunately, with GPS receivers that rely on software computations in the digital signal processor and/or microprocessor of the mobile terminal, there may be insufficient computing power to process the GPS signals quickly enough. Moreover, a given mobile terminal may also not see a sufficient number of GPS satellites at adequate signal levels to perform the positioning determination. Finally, the time it takes to find all the GPS signals to do a location fix may be greatly impacted by how fast the first GPS satellite signal is found. Embodiments of the invention can solve these and/or other potential problems by providing cooperative GPS processing among mobile terminals that communicate over a short-range, ad hoc wireless network.

By way of background, position determination techniques, such as GPS, use a collection of a requisite number of ranging measurements from signals passed between transmitter(s) and receiver(s), wherein either the transmitter(s) or the receiver(s) have known or determinable locations (i.e., positions). Further, each of the collected ranging measurements can generally be converted from a time interval measurement to a corresponding distance measurement, for example, by multiplying by the speed of light or an expected speed of transmission associated with the signal. Once the conversion from time to distance has been accomplished, then traditional triangulation, or other like mathematical techniques can be used to determine the positional coordinates of the mobile terminal, based on the known locations and calculated distances.

In the case of the GPS location technique, the positions of the GPS satellites vary with time. Thus, a GPS receiver generally needs to receive an accurate measurement of time from the GPS satellites (or an accurate GPS-related source on the ground) in order to know the positions of the GPS satellites at the time of the ranging measurements. The ranging measurements between the GPS receiver and each of at least four (4) GPS satellites occurs by: 1) finding the starting point on the 1023 chip long Gold code sequence within the signal transmitted by each GPS satellite; 2) finding the start time of a bit edge; and 3) finding the start time of the data message. The resulting "time of flight" for the signal received from each GPS satellite is then converted to distance. The resulting four (4) range measurements allow for a solution to the GPS receiver's position in x, y and z coordinates and for determination of the unknown time difference between the GPS time and the GPS receiver's independent clock.

Figure 5:
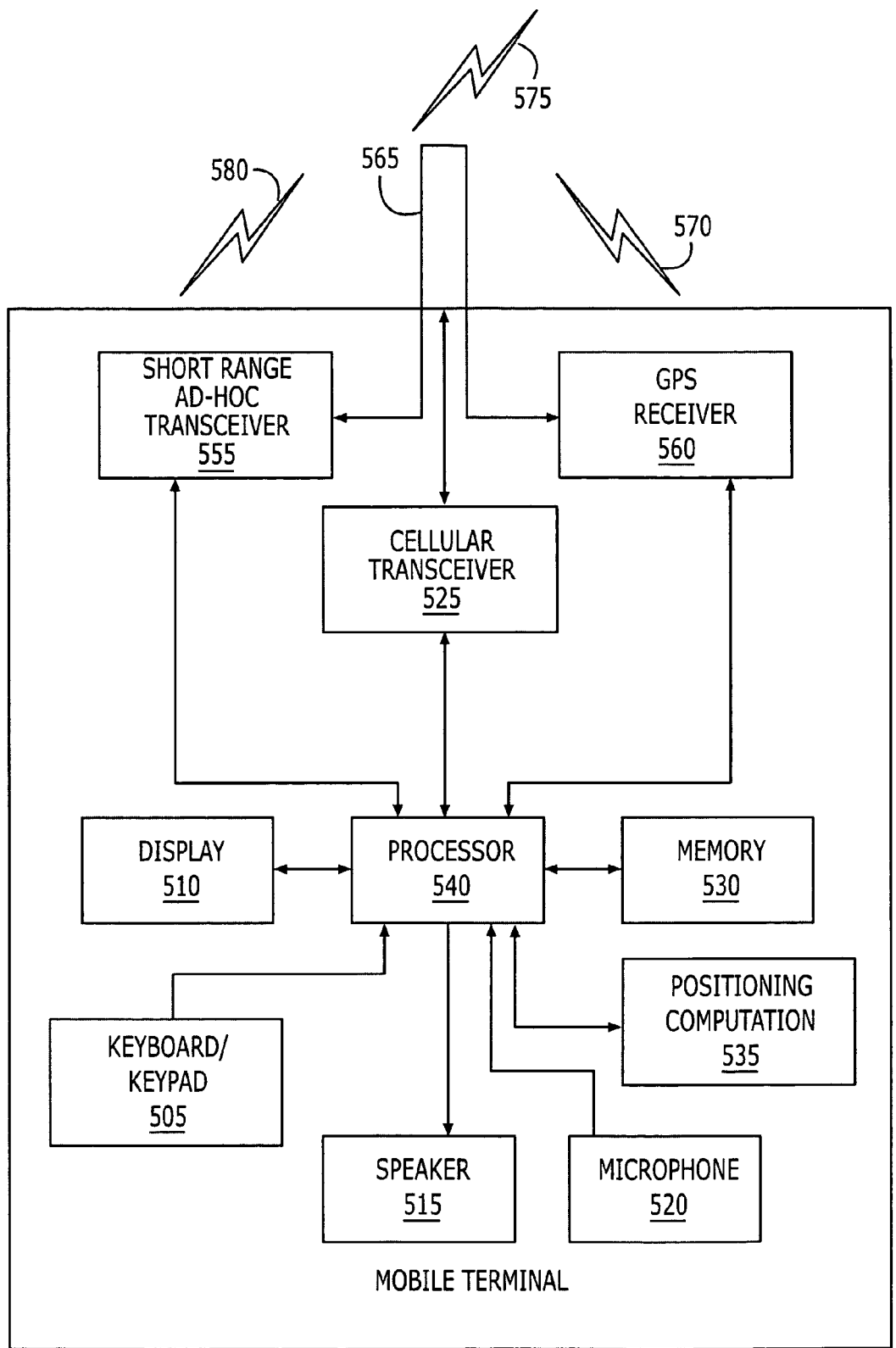
FIG. 5 is a block diagram of a mobile terminal according to various embodiments of the invention.

FIG. 5 is a block diagram of a mobile terminal 400, which may correspond to any one of the mobile terminals 400a-400d of FIG. 4, and which includes mobile terminal positioning computation, according to various embodiments of the present invention. In particular, FIG. 5 illustrates a mobile terminal 400, a short-range, ad hoc wireless network signal 580, a GPS signal 570 and a cellular communication network signal 575. The mobile terminal 400 may include a keyboard/keypad 505, a display 510, a speaker 515, a microphone 520, a cellular transceiver 525, and a memory 530 that communicate with a processor (microprocessor and/or digital signal processor) 540. The cellular transceiver 525 typically comprises a transmitter circuit 350 and a receiver circuit 345, which respectively transmit outgoing radio frequency signals to a base station of the cellular network and receive incoming radio frequency signals from the cellular network, such as voice communications, text messaging, email and the like, via an antenna 565. While a single antenna 565 is shown in FIG. 5, it is to be understood that multiple antennas and/or different types of antennas may be utilized based on the types of signals being received. The radio frequency signals transmitted between the mobile terminal 400 and the cellular network may include both traffic and control signals (e.g., paging signals/messages for incoming calls), which are used to establish and maintain communication with another party or destination, and may provide uplink and/or downlink communications. However, the present invention is not limited to such two-way communication systems. The foregoing components of the mobile terminal 400 may be included in many conventional mobile terminals and their functionality is generally known to those skilled in the art.

Also shown in the mobile terminal 400 of FIG. 5 is a short-range, ad hoc transceiver 555 and a satellite positioning system receiver, in particular, a GPS receiver 560. The ad hoc transceiver 555, in cooperation with the processor 540, communicates with one or more other mobile terminals. The operations of the ad hoc transceiver 555 and the cellular transceiver 525 support different associated wireless communication protocols for the cellular communication network and the ad hoc network, which generally are uncoordinated with one another. For example, in some embodiments of the present invention, the short-range, ad hoc transceiver 555 is configured to support communications with an ad hoc protocol transmitter, such as a Bluetooth protocol transmitter. As used herein, an "ad hoc" protocol, network or transceiver refers to one that is generally configured at the time of use based on the resources available. Such networks typically provide a service discovery protocol to allow, for example, identification of available resources. They may also negotiate various aspects of operations, such as peer relationships between resources, at the time of use of the resources. Moreover, "short-range" means a distance of about 100 meters or less, and may often be about 10 meters or less. In other embodiments of the present invention, the short-range, ad hoc transceiver 555 is configured to communicate with mobile terminals in a wireless local area network (WLAN), such as an 802.11 series protocol compliant network. As used herein, an 802.11 series protocol compliant network includes 802.11a, 802.11b, 802.11g and any variations thereon that should be developed in the future.

The GPS receiver 560, in cooperation with the processor 540, provides a processing system (apparatus or circuit)/method configured to process location signals, such as ranging signals, received from GPS satellites 42. It will be understood, however, that not every mobile terminal 400 in the short-range, ad hoc wireless network need include a GPS receiver 560.

As also shown in FIG. 5, the mobile terminal 400 further includes a mobile terminal positioning computation system (apparatus/circuit) and/or method 535 that is configured to use satellite positioning system information cooperatively with at least one other mobile terminal that communicates with the given mobile terminal over the short-range, ad hoc wireless network, to cooperatively determine the position of the given mobile terminal. The positioning computation system/method 535 may contain one subsystem/method that is used when the mobile terminal is cooperatively determining its own position, and another subsystem/method that is used when the mobile terminal is cooperatively helping determine the position of another mobile terminal. These subsystems/methods may be merged, in whole or in part. Detailed operations for cooperative positioning systems/methods, according to various embodiments of the invention, will be described below.

While, for example, the positioning computation system/method 535, and the processor 540 are shown as distinct blocks in the illustration of FIG. 5, it is to be understood that the functionality of these blocks may be combined into a single processor or spread across a plurality of different processors and/or other hardware configured to operate in the manner described herein. Furthermore, while the positioning computation system/method 535 and the GPS receiver 560 are shown as distinct blocks in the illustration of FIG. 5, it is to be understood that aspects of the functionality of these blocks may be spread across different processors or circuitry and that the GPS receiver 560 may also, in part, provide the positioning computation system/method 535 of the present invention.

Figure 6:
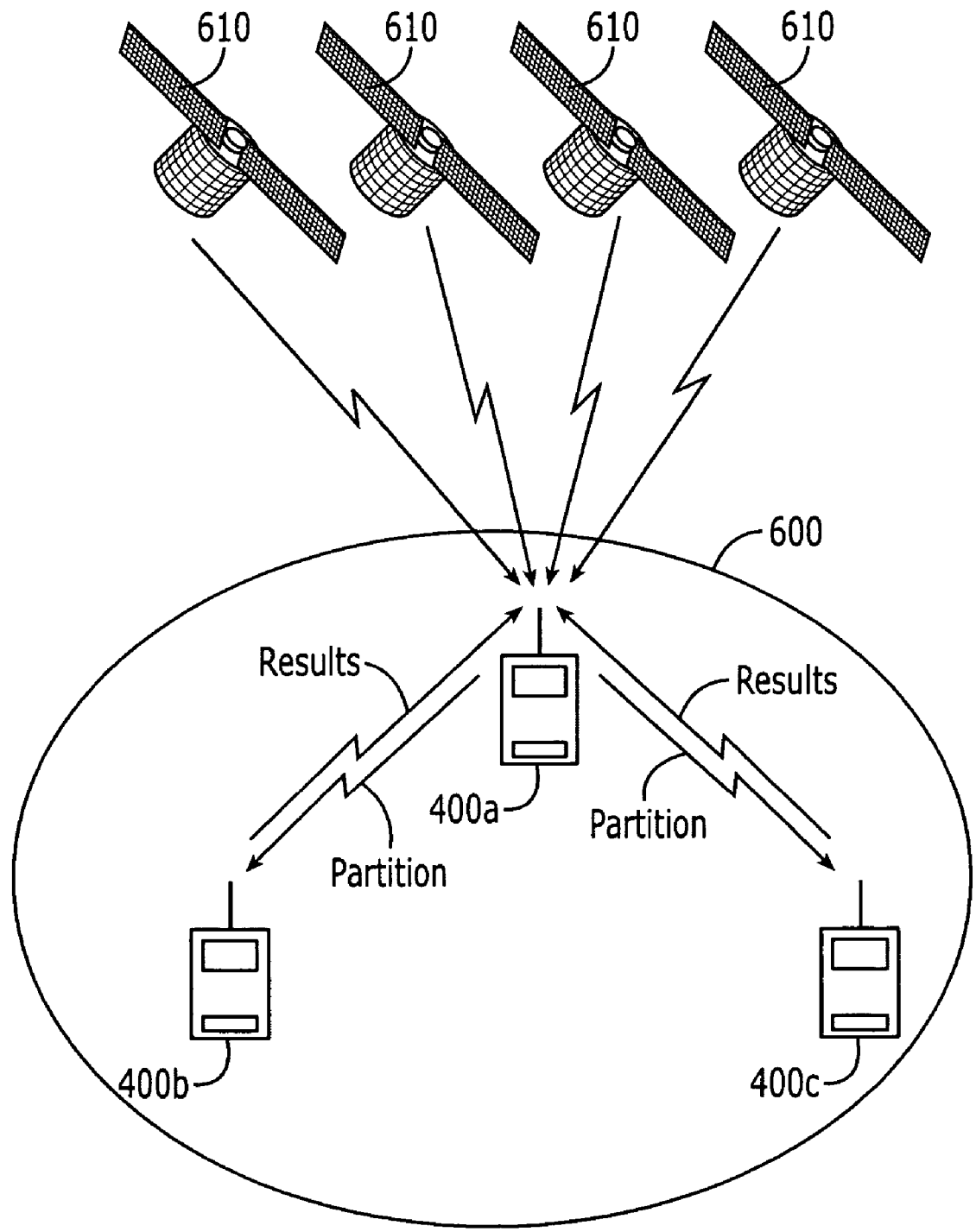
FIG. 6 is a schematic block diagram illustrating cooperative position determining according to some embodiments of the present invention.

FIG. 6 is a block diagram of cooperative GPS processing using partitioning according to various embodiments of the present invention. As shown in FIG. 6, a community of mobile terminals 400a-400c are linked together in a short-range, ad hoc wireless network 600. At least one of the mobile terminals 400a, also referred to as a given mobile terminal, includes a GPS receiver, such as a GPS receiver 560 of FIG. 5. This mobile terminal 400a receives GPS signals from GPS satellites 610, stores the GPS signals in memory, such as the memory 530 of FIG. 5, and then shares the signal among the other nearby mobile terminals 400b-400c via the ad hoc links. The mobile terminals 400a-400c share the processing load to search for and process the GPS signals. The other terminals 400b/400c can send the processed data, such as the start point of the PN code for each satellite processed relative to the data set, back to the given terminal 400a, which then combines the data to calculate its position.

Figure 7:
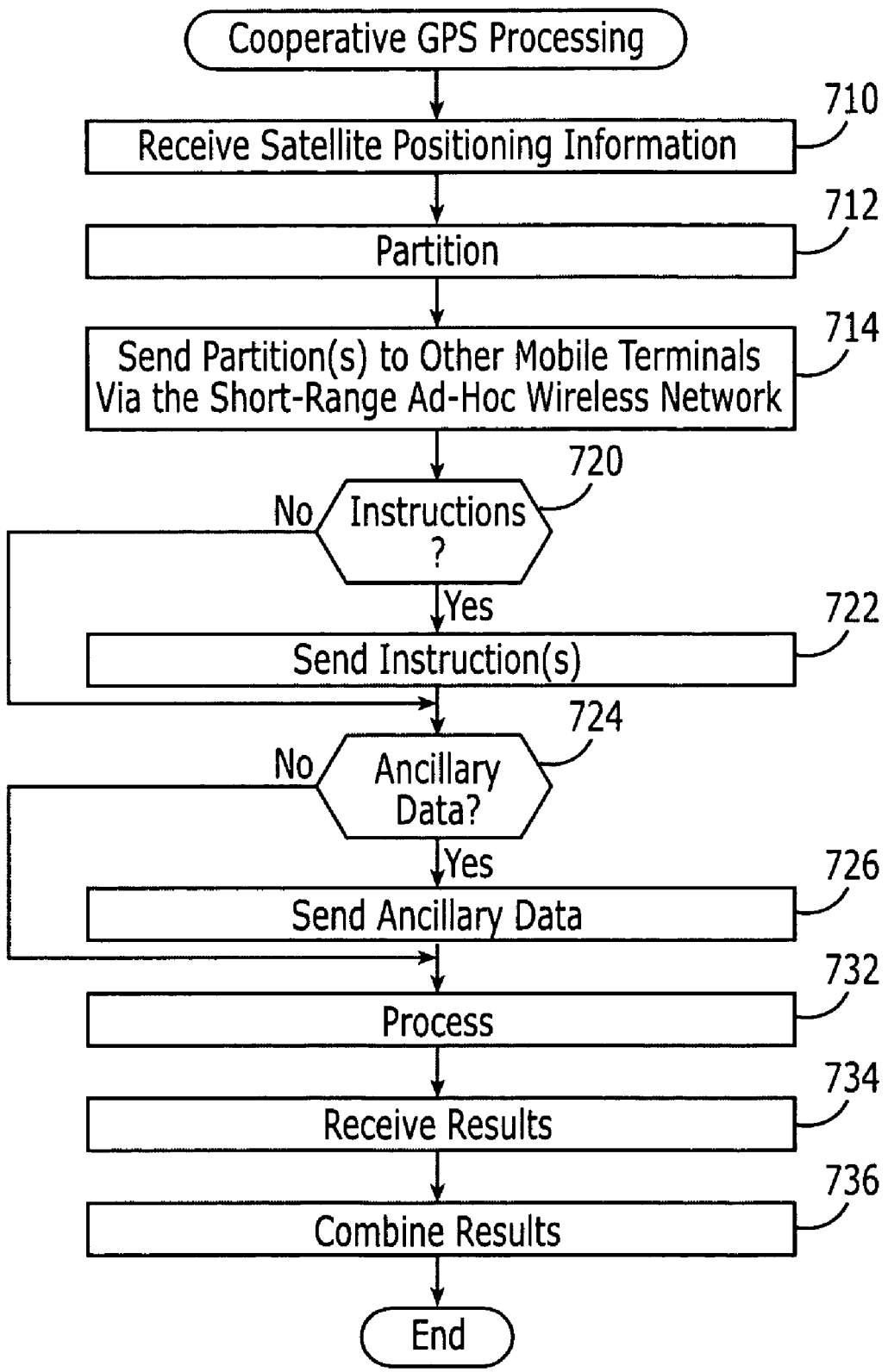
FIG. 7 is a flowchart of operations that may be performed for cooperative position determining in embodiments of FIG. 6.

FIG. 7 is a flowchart of operations that may be performed by a mobile terminals 400a-400c to perform cooperative GPS processing according to those embodiments of the present invention that were illustrated in FIG. 6. These operations may be performed, for example, by a positioning computation system/method 535 of FIG. 5. Specifically, at Block 710, satellite positioning information is received at the given mobile terminal 400a from one or more GPS satellites 610. Then, at Block 712, the processing of the satellite positioning information that is used to determine the positioning of the given mobile terminal 400a is partitioned. Many techniques may be used to partition the satellite positioning information. For example, in some embodiments, the satellite positioning information is partitioned according to the GPS satellite 610 from which the information is received, so a given partition corresponds to the satellite positioning information from a given satellite. However, other techniques also may be used to partition the information.

Still referring to FIG. 7, at Block 714, the partition(s) are sent to the other mobile terminals 400b/400c via the short-range, ad hoc wireless network 600, as illustrated in FIG. 6. It will be understood by those having skill in the art that the given mobile terminal 400a may keep one or more partitions for its own processing. Moreover, not every other mobile terminal 400b, 400c need receive the partition, and the partitions that are received by a given other mobile terminal 400b, 400c need not be equal in size or complexity.

It will also be understood by those having skill in the art that, in other embodiments of the present invention, at Block 714, the same partition may be sent to multiple mobile terminals 400b and 400c whose processing capability and/or availability may differ, so that the same partition may be processed in duplicate, and the results that are received first are used and/or the results are combined.

Still referring to FIG. 7, in some embodiments of the present invention, if there are processing instructions that are associated with the processing (Block 720), the processing instructions are also sent, at Block 722, via the short-range, ad hoc wireless network. Moreover, ancillary data may also be available at Block 724. The ancillary data may be sent at Block 726 via the short-range, ad hoc wireless network. It will also be understood that the ancillary data may be acquired by and/or sent between any two or more of the other mobile terminals 400a-400c. The use of ancillary data, such as assistance data, to assist in processing GPS data more quickly, is well known to those having skill in the art, and need not be described further herein.

Still referring to FIG. 7, at Block 732, the partitions are processed at the given mobile terminal 400a and/or at the other mobile terminals 400b, 400c, to generate results. The results may be a range measurement and/or other intermediate data that is produced from the received satellite positioning information. At Block 734, the results are received at the given mobile terminal 400a, as also illustrated in FIG. 6. Finally, at Block 736, the results are combined at the given mobile terminal 400a to determine the position of the given mobile terminal 400a.

Figure 8:
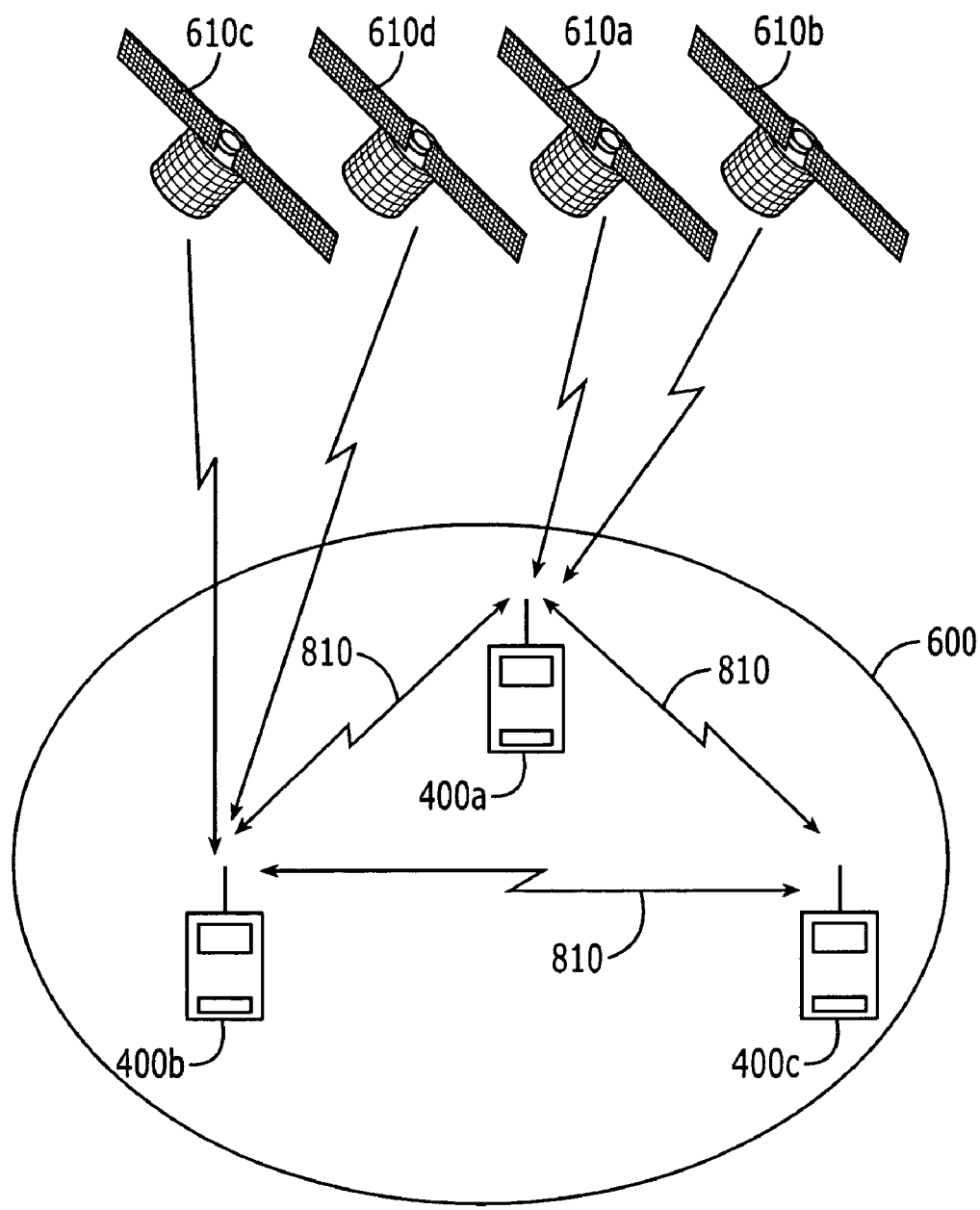
FIG. 8 is a schematic block diagram illustrating cooperative position determining according to other embodiments of the present invention.

FIG. 8 is a block diagram of other embodiments of the present invention, wherein cooperative GPS processing takes place by distributing the receiving of satellite positioning system information from GPS satellites among mobile terminals that are connected using a short-range, ad hoc wireless network. Thus, GPS data received at multiple mobile terminals may be used to calculate a location of a given mobile terminal.

In particular, referring to FIG. 8, GPS data from two GPS satellites 610a, 610b are received by the given mobile terminal 400a, and GPS data from two other GPS satellites 610c, 610d are received by one or more of the other mobile terminals 400b. This situation may take place if, for example, the given mobile terminal 400a only sees two GPS satellite signals as it is near a north-facing window of a building, whereas the other mobile terminal 400b sees two different satellite signals, as it is near a south-facing window in the building.

As shown in FIG. 8, the given mobile terminal 400a and at least one other mobile terminal 400b share the GPS signals (as received and/or as processed), to cooperatively determine the position of a given mobile terminal 400a.

Figure 9:
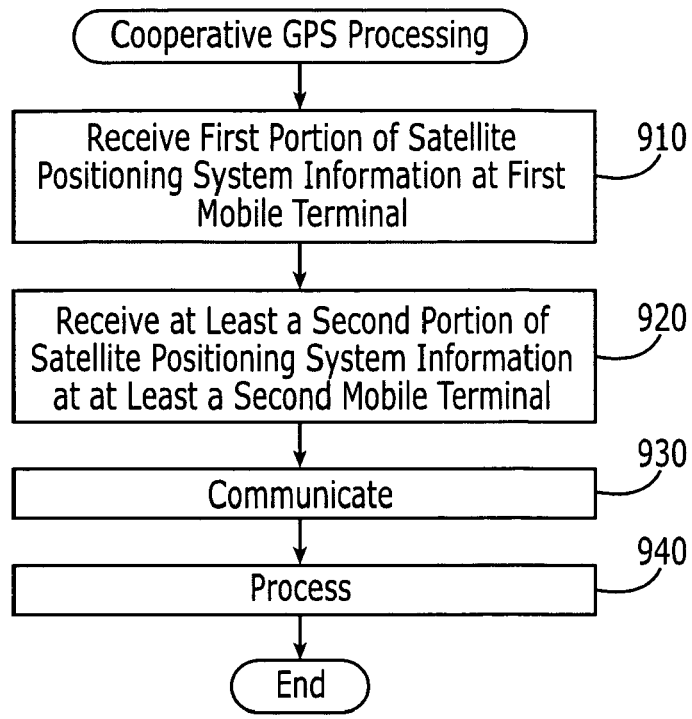
FIG. 9 is a flowchart of operations that may be performed for cooperative position determining in other embodiments of FIG. 8.

FIG. 9 is a flowchart of operations that may be performed by a given mobile terminal 400a and/or another mobile terminal 400b of FIG. 8, according to some embodiments of the present invention. These operations may be performed, for example, by a positioning computation system/method 535 of FIG. 5. More specifically, referring to FIG. 9, at Block 910, a first portion of the satellite positioning system information, such as the signals from GPS satellites 610a and 610b, is received at the given (first) mobile terminal 400a. At Block 920, at least a second portion of the satellite positioning system information, such as the signals from GPS satellites 610c and 610d, is received at least one other (second) mobile terminal 400b. The received signals are then communicated (distributed) among the mobile terminals in the short-range, ad hoc wireless network 600 at Block 930, and processed by the mobile terminals in the short-range, ad hoc wireless network 600 at Block 940.

It will be understood that the operations of Blocks 930 and 940 may be performed in a different order and/or may be combined. For example, the given mobile terminal 400a may process the signals from GPS satellite 610a, 610b without communicating these signals. Moreover, the other mobile terminal 400b may communicate the signals that are received from the second and third GPS satellites 610c, 610d without processing them, or may process these signals and then communicate the processing results. Various other combinations may be provided.

Moreover, when the satellite positioning system information is processed to provide GPS timing information, such as PN code phase, the timing information may be synchronized relative to a feature of the short-range, ad hoc wireless network protocol. Thus, satellite positioning system timing information such as PN code phase, may be used cooperatively by the given mobile terminal 400a and at least one other mobile terminal 400b that communicates with a given mobile terminal 400a over the short-range, ad hoc wireless network, by synchronizing the positioning system timing information relative to a feature in the protocol that is used by the short-range, ad hoc wireless network communications. In some embodiments, the timing information can be synchronized relative to a header field and/or other feature of the ad hoc network protocol.

In some embodiments, the timing information may be provided to the given mobile terminal 400a and/or to one of the other mobile terminals 400b/400c in response to a request for satellite positioning system timing information between the given mobile terminal 400a and the at least one other mobile terminal 400b/400c that is communicated over the short-range, ad hoc wireless network 600. The satellite positioning system timing information is then communicated in response to the request. In other embodiments, satellite positioning system timing information may be repeatedly broadcast by one or more of the mobile terminals 400a-400c over the short-range, ad hoc wireless network 600, so that this timing information is periodically available among the mobile terminals 400a-400c that communicate over the short-range, ad hoc wireless network 600.

Figure 10:
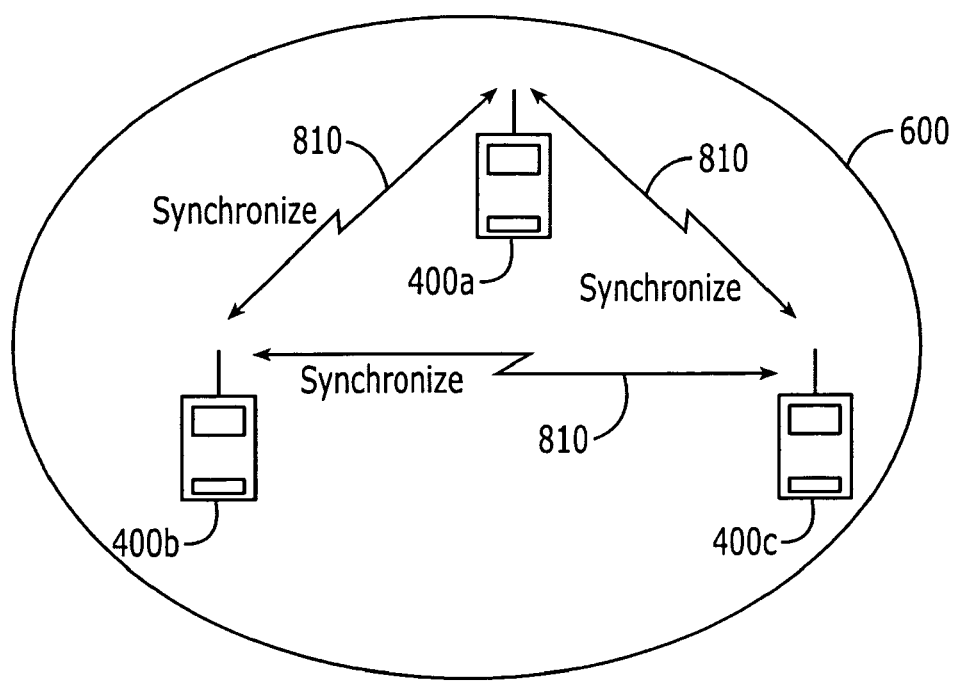
FIG. 10 is a schematic block diagram illustrating cooperative position determining according to still other embodiments of the present invention.

FIG. 10 is a block diagram of cooperative GPS processing according to yet other embodiments of the present invention. In these embodiments, the satellite positioning system information (processed and/or unprocessed) that is communicated between the given mobile terminal 400a and the at least one other mobile terminal 400b, 400c over the short-range, ad hoc wireless network 600 is synchronized relative to a feature in the protocol that is used in the short-range, ad hoc wireless communication links 810. For example, in some embodiments, the satellite positioning timing information can comprise timing of the satellite positioning PN code phase, and the communication of the satellite positioning PN code phase among the mobile terminals 400a-400c may be synchronized using the timing of a given field, such as a header field, in the short-range, ad hoc wireless network communications 810.

Accordingly, timing information may be communicated among the mobile terminals 400a-400c in the short-range, ad hoc wireless network 600 using a timing feature of the ad hoc link air interface 810. For example, some mobile terminals in the short-range, ad hoc wireless network 600 can maintain timing and PN phase information of one or more of the stronger GPS signals, and link that timing and/or PN phase information to a timing feature of the ad hoc network protocol along with data about that relationship as a broadcast message and/or as a response message, to be available to the other mobile terminals 400a-400c in the ad hoc network 600.

Figure 11:
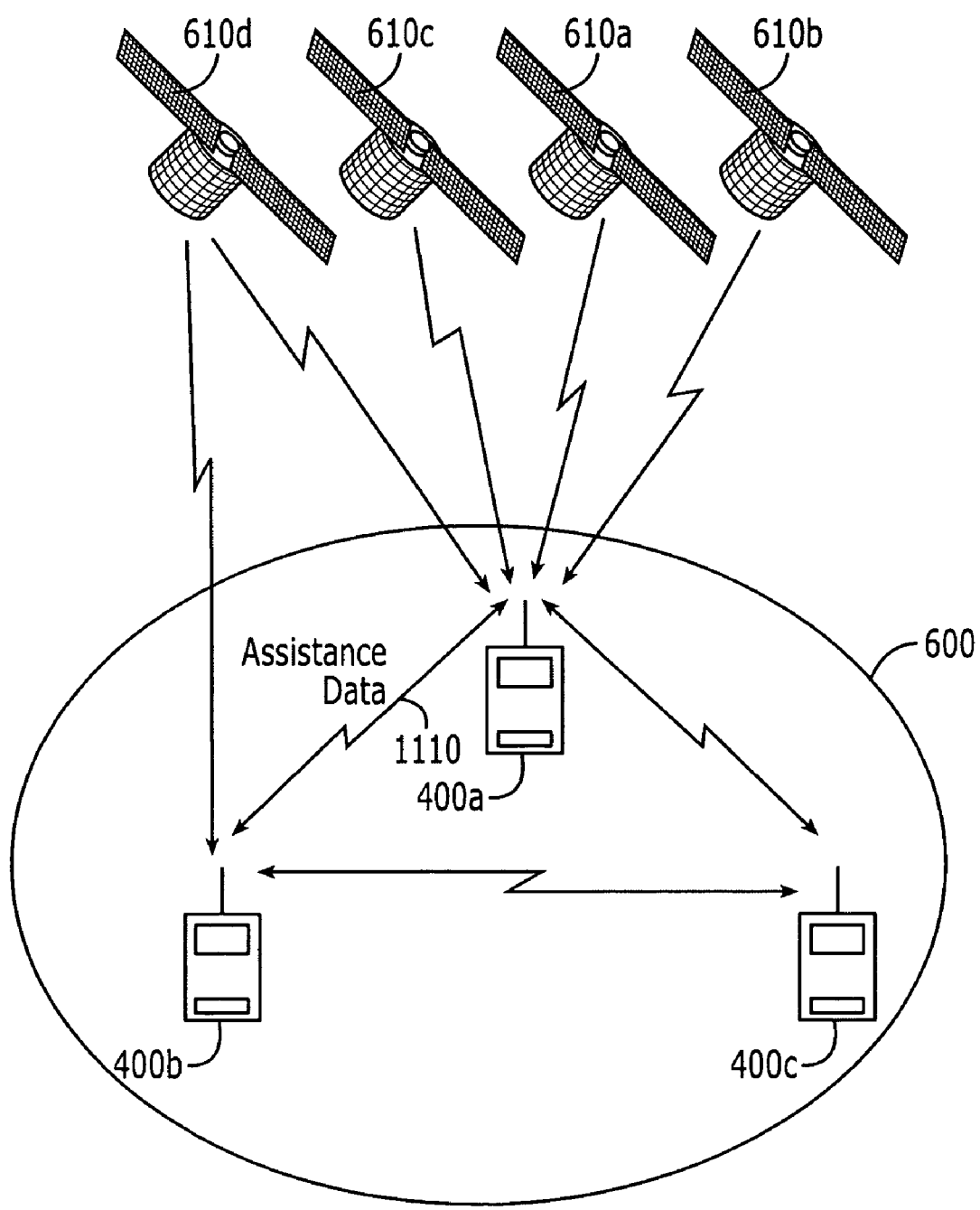
FIG. 11 is a schematic block diagram illustrating cooperative position determining according to yet other embodiments of the present invention.

FIG. 11 is a block diagram of cooperative GPS processing according to still other embodiments of the present invention. These embodiments communicate assistance data 1110 between one mobile terminal 400a and another mobile terminal 400b over the short-range, ad hoc wireless network 600, so that the assistance data may be used by another mobile terminal to cooperatively determine a position.

For example, as shown in FIG. 11, a given mobile terminal 400a may receive GPS signals from four GPS satellites 610a-610d. One of the other mobile terminals 400b may also obtain the GPS signal from the GPS satellite 610d. The other mobile terminal 400b can generate assistance data 1110 from the GPS signal, and then may communicate the assistance data 1110 to the given mobile terminal 400a and/or to one of the other mobile terminals 400c via the short-range, ad hoc wireless network 600.

Moreover, in these embodiments, the assistance data may be synchronized among the mobile terminals 400a-400c relative to a feature of the short-range, ad hoc wireless network communication protocol. For example, as shown in FIG. 11, one of the other mobile terminals 400b can deliver to the given mobile terminal 400a the exact timing of a satellite 610d PN code phase using a timing feature of the ad hoc network. In this way, the given mobile terminal 400a can find the satellite signal more quickly with a more directed search of the received data. By using this assistance data, the given mobile terminal 400a and/or one of the other mobile terminals 400b/400c that is performing processing, may more quickly determine a position.

Figure 12:
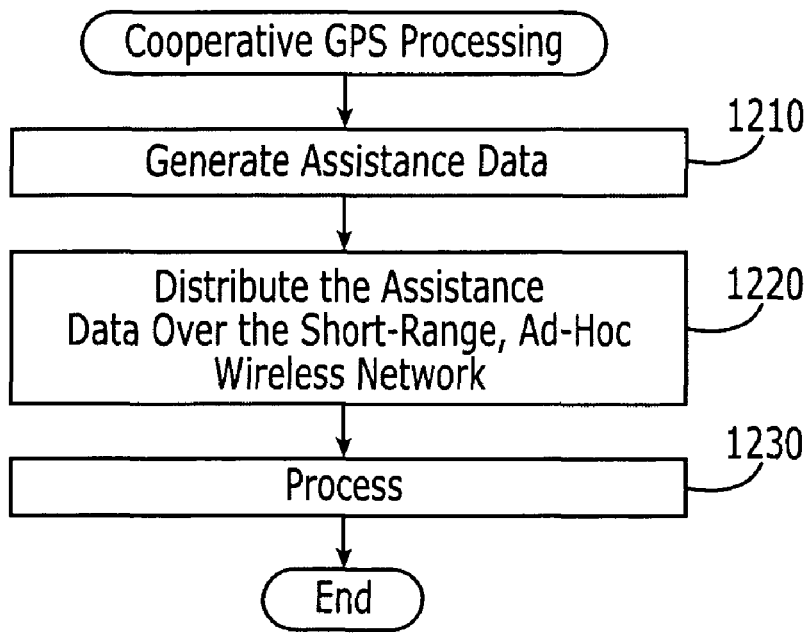
FIG. 12 is a flowchart of operations that may be performed for cooperative position determining in embodiments of FIG. 11.

FIG. 12 is a flowchart of operations that may perform cooperative GPS processing according to embodiments of the invention that were illustrated in FIG. 11. These operations may be performed, for example, by a positioning computation system/method 535 of FIG. 5. As shown in FIG. 12, at Block 1210, assistance data is generated by one or more of the mobile terminals 400a-400c that are linked in the short-range, ad hoc wireless network 600. The generation of assistance data is well known to those having skill in the art, and need not be described further herein. Moreover, the term "generating assistance data" also includes acquiring assistance data by one or more of the mobile terminals 400a-400c, from a wide area network and/or using other conventional techniques.

Continuing with the description of FIG. 12, at Block 1220, the assistance data 1110 is communicated (distributed) over the short-range, ad hoc wireless network 600. In some embodiments, the data is communicated by synchronizing satellite positioning system timing information using a timing feature of the short-range, ad hoc wireless network protocol. For example, a C/A code start point may be indicated as being a given number of microseconds off a unique Bluetooth feature such as a header. Then, at Block 1230, the satellite positioning system data is processed by one or more of the mobile terminals 410a-410c using the assistance data 1110.

Figure 13:
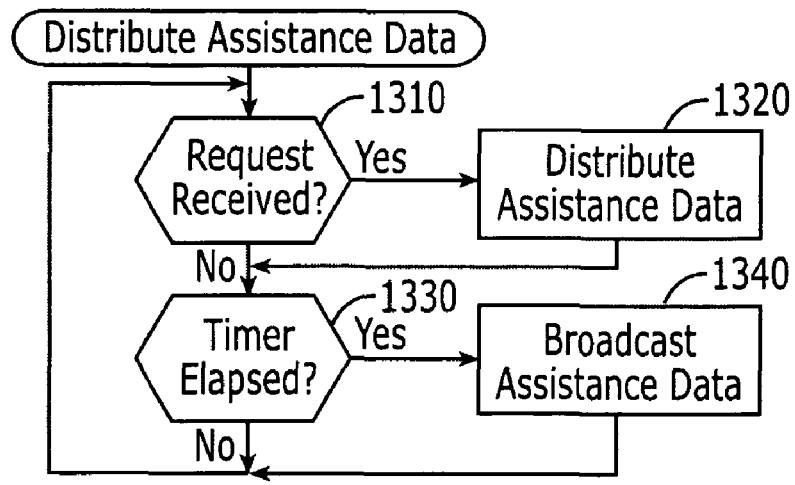
FIG. 13 is a flowchart of operations that may performed to distribute assistance data according to embodiments of FIG. 12.

FIG. 13 is a flowchart of operations that may be performed to distribute assistance data according to various embodiments of the present invention, which may correspond to Block 1220 of FIG. 12. These operations may also be used to distribute other ancillary information, according to other embodiments of the present invention.

Specifically, referring to FIG. 13, at Block 1310, a request may be received at one of the mobile terminals 400a-400c for assistance data and/or other ancillary information from another mobile terminal 400a-400c over the short-range, ad hoc wireless network 600. At Block 1320, the assistance data and/or other information is distributed as a response.

Continuing with the description of FIG. 13, at Block 1330, if a timer elapses, then the assistance data is broadcast at Block 1340. It will be understood by those having skill in the art that the operations of Blocks 1310 and 1330 may execute separately, or in combination as shown in FIG. 13. The distribution of data at Block 1320 and/or the broadcast of data at Block 1340 may take place by synchronizing the data relative to timing information in the short-range, ad hoc wireless network communications protocol, as was described above.

Figure 14:
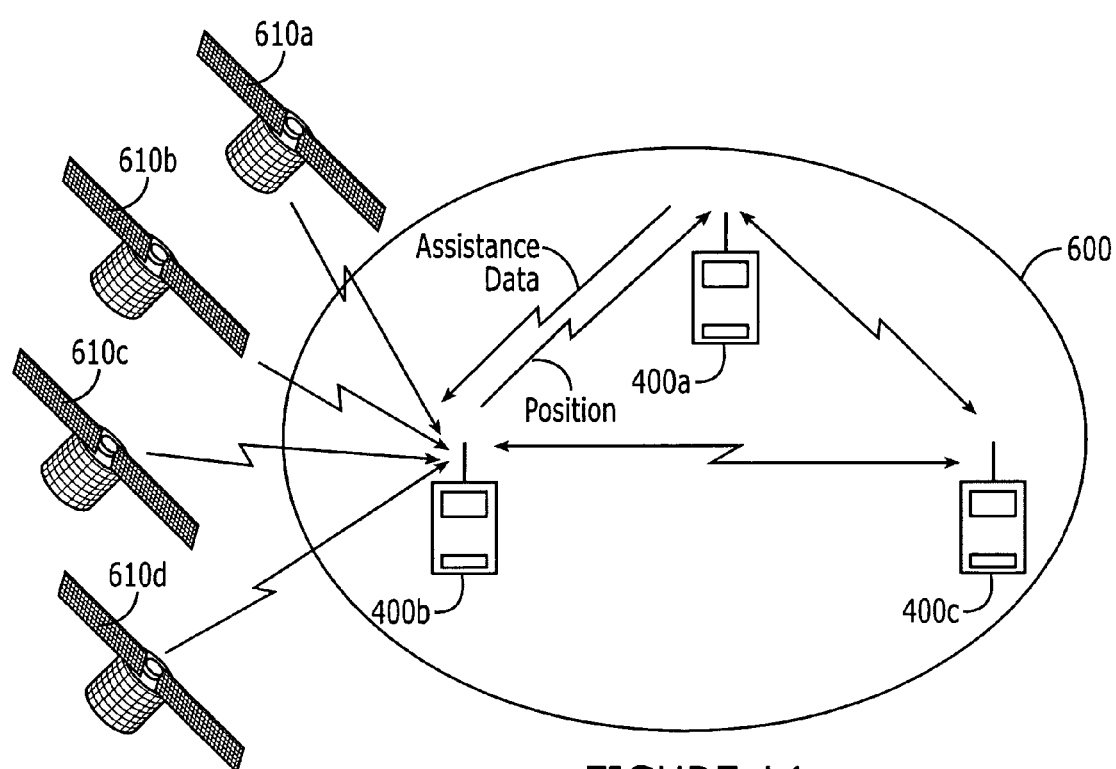
FIG. 14 is a schematic block diagram illustrating cooperative position determining according to still other embodiments of the present invention.

FIG. 14 is a block diagram of cooperative GPS processing according to still other embodiments of the present invention. In embodiments of FIG. 14, the given mobile terminal 400*a* may not contain a GPS system. Yet, the given mobile terminal 400*a* may obtain its position by communicating with at least one other mobile terminal 400*b* over the short-range, ad hoc wireless network 600. In particular, the given mobile terminal gains access to GPS assistance data, for example, to assistance data on the Internet through the wide area network and/or to cellular network assistance data. The assistance data may also be obtained by the given mobile terminal 400*a* from another mobile terminal 400*c* using the short-range, ad hoc wireless link. Regardless of how it is obtained, the given mobile terminal 400*a* then passes this assistance data to at least one other mobile terminal 400*b* that includes a GPS receiving system. The other mobile terminal 400*b* then determines its location via GPS utilizing the assistance data it received from a given mobile terminal 400*a* over the short-range, ad hoc wireless link. As shown in FIG. 14, this location or position information is then passed back to the given mobile terminal 400*a*. Thus, the given mobile terminal 400*a* does not need to have a GPS receiver in order to determine its position. Rather, it obtains its own position information in concert or cooperation with a remote device 400*b* containing both a short-range, ad hoc wireless link and GPS. The remote device 400*b* is provided with assistance data, so that it can obtain better performance and/or can work in locations where a standalone GPS might not otherwise work.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of determining a position of a given mobile terminal comprising:
   receiving satellite positioning information directly from a plurality of satellites at the given mobile terminal;
   partitioning the satellite positioning information that is received directly from a plurality of satellites at the given mobile terminal into a plurality of partitions;
   communicating at least one of the plurality of partitions to the at least one other mobile terminal over a short-range, ad hoc wireless network for processing of the at least one of the plurality of partitions of the satellite positioning information by the at least one other mobile terminal;
   receiving results of processing of the at least one of the plurality of partitions of the satellite positioning information from the at least one other mobile terminal over the short-range, ad hoc wireless network; and
   combining the results at the given mobile terminal to cooperatively determine the position of the given mobile terminal.

2. A method according to claim 1 further comprising:
   communicating instructions for processing the at least one of the plurality of partitions of the satellite positioning information from the given mobile terminal to the at least one other mobile terminal over the short-range, ad hoc wireless network.

3. A method according to claim 1 further comprising:
   communicating ancillary data for the at least one of the plurality of partitions from the given mobile terminal to the at least one other mobile terminal over the short-range, ad hoc wireless network.

4. A method according to claim 1 wherein partitioning comprises partitioning processing of the satellite positioning information for a respective one of a plurality of satellite positioning system satellites into a respective one of the plurality of partitions.

5. A method according to claim 1 wherein communicating at least one of the plurality of partitions comprises communicating one of the plurality of partitions to more than one other mobile terminal over the short-range, ad hoc wireless network for duplicate processing by the more than one other mobile terminal.

6. A method according to claim 1 further comprising:
   receiving a first portion of the satellite positioning system information from the satellite positioning system at the given mobile terminal;
   receiving at least a second portion of the satellite positioning system information from the satellite positioning system at the at least one other mobile terminal; and
   communicating at least one of the portions of the satellite positioning system information between the given mobile terminal and the at least one other mobile terminal over the short-range, ad hoc wireless network.

7. A method according to claim 1 wherein the satellite positioning system information comprises satellite positioning system timing information.

8. A method according to claim 7 wherein communicating satellite positioning system information comprises:
   synchronizing the satellite positioning system timing information that is communicated between the given mobile terminal and the at least one other mobile terminal over the short-range, ad hoc wireless network relative to a feature of a protocol that is used for the short-range, ad hoc wireless network communications.

9. A method according to claim 7 wherein communicating at least one of the plurality of partitions is preceded by communicating a request for satellite positioning system timing information between the given mobile terminal and the at least one other mobile terminal over the short-range, ad hoc wireless network and wherein communicating satellite positioning system timing information is performed in response to communicating the request for the satellite positioning system timing information.

10. A method according to claim 1 wherein communicating at least one of the plurality of partitions comprises:
    synchronizing the partitions of the satellite positioning system information that are communicated between the given mobile terminal and the at least one other mobile terminal over the short-range, ad hoc wireless network relative to a feature of a protocol that is used for the short-range, ad hoc wireless network communications.

11. A method according to claim 1 further comprising:
    communicating assistance data between the given mobile terminal and the at least one other mobile terminal over the short-range, ad hoc wireless network to cooperatively determine the position of the given mobile terminal by the given mobile terminal and the at least one other mobile terminal that communicate over the short-range, ad hoc wireless network, using the assistance data.

12. A method according to claim 1 wherein the short-range, ad hoc wireless network comprises a Bluetooth network.

13. A method according to claim 1 wherein communicating satellite positioning system information further comprises communicating assistance data and/or synchronizing timing of satellite positioning information between the given mobile terminal and the at least one other mobile terminal over the short-range, ad hoc wireless network to cooperatively determine the position of the given mobile terminal by the given mobile terminal and the at least one other mobile terminal that communicate over the short-range, ad hoc wireless network.

14. A mobile terminal comprising:
 a cellular network transceiver that is configured to communicate with a cellular base station;
 a short-range, ad hoc wireless network transceiver that is configured to communicate over a short-range, ad hoc wireless network; and
 a mobile terminal positioning system that is configured to receive satellite positioning information directly from a plurality of satellites, to partition the satellite positioning information that is received directly from the plurality of satellites at the mobile terminal into a plurality of partitions, to communicate at least one of the plurality of partitions to at least one other mobile terminal via the short-range, ad hoc wireless network transceiver for processing of the at least one of the plurality of partitions of the satellite positioning information by the at least one other mobile terminal, to receive results of processing of the at least one of the plurality of partitions of the satellite positioning information from the at least one other mobile terminal via the short-range, ad hoc wireless transceiver and to combine the results to cooperatively determine the position of the mobile terminal.

15. A mobile terminal according to claim 14 wherein the mobile terminal positioning system is further configured to communicate instructions for processing the at least one of the plurality of partitions of the satellite positioning information from the mobile terminal to the at least one other mobile terminal via the short-range, ad hoc wireless transceiver.

16. A mobile terminal according to claim 14 wherein the mobile terminal positioning system is further configured to communicate ancillary data for the at least one of the plurality of partitions from the mobile terminal to the at least one other mobile terminal via the short-range, ad hoc wireless transceiver.

17. A mobile terminal according to claim 14 wherein the mobile terminal positioning system is configured to partition by partitioning processing of the satellite positioning information for a respective one of a plurality of satellite positioning system satellites into a respective one of the plurality of partitions.

18. A mobile terminal according to claim 14 wherein the mobile terminal positioning system is configured to communicate at least one of the plurality of partitions by communicating one of the plurality of partitions to more than one other mobile terminal via the short-range, ad hoc wireless transceiver for duplicate processing by the more than one other mobile terminal.

19. A mobile terminal according to claim 14 wherein the mobile terminal positioning system is further configured to receive a first portion of the satellite positioning system information from the satellite positioning system and to receive at least a second portion of the satellite positioning system information from the at least one other mobile terminal via the short-range, ad hoc wireless transceiver.

20. A mobile terminal according to claim 14 wherein the mobile terminal positioning system is further configured to synchronize the portions of the satellite positioning system information that are communicated between the mobile terminal and the at least one other mobile terminal via the short-range, ad hoc wireless transceiver relative to a feature of a protocol that is used for the short-range, ad hoc wireless network communications.

21. A mobile terminal according to claim 14 wherein the mobile terminal positioning system is further configured to communicate assistance data between the mobile terminal and the at least one other mobile terminal via the short-range, ad hoc wireless transceiver to cooperatively determine the position of the mobile terminal by the mobile terminal and the at least one other mobile terminal that communicate over the short-range, ad hoc wireless network, using the assistance data.

22. A mobile terminal according to claim 14 wherein the short-range, ad hoc wireless network comprises a Bluetooth network.

23. A mobile terminal according to claim 14 wherein the mobile terminal positioning system is further configured to communicate satellite positioning system information by communicating assistance data and/or synchronizing timing of satellite positioning information between the mobile terminal and the at least one other mobile terminal via the short-range, ad hoc wireless transceiver.

* * * * *